(12) United States Patent
Ishak

(10) Patent No.: US 7,066,596 B2
(45) Date of Patent: *Jun. 27, 2006

(54) RUGATE LENS FOR GLASSES

(76) Inventor: Andrew Ishak, 902 Revolution St., Havre de Grace, MD (US) 21078

( * ) Notice: Subject to any disclaimer, the term of this patent is extended or adjusted under 35 U.S.C. 154(b) by 68 days.

This patent is subject to a terminal disclaimer.

(21) Appl. No.: 10/856,688

(22) Filed: May 28, 2004

(65) Prior Publication Data

US 2005/0018131 A1   Jan. 27, 2005

Related U.S. Application Data

(63) Continuation-in-part of application No. 10/000,062, filed on Nov. 2, 2001, now abandoned.

(51) Int. Cl.
*G02C 7/10* (2006.01)
(52) U.S. Cl. ............................. 351/163; 351/44; 351/49
(58) Field of Classification Search ................ 351/44, 351/49, 163–165
See application file for complete search history.

(56) References Cited

U.S. PATENT DOCUMENTS 6,102,539 A * 8/2000 Tucker ...................... 351/44
6,411,450 B1 * 6/2002 Gatewood et al. .......... 359/885

* cited by examiner

*Primary Examiner*—Scott J. Sugarman
(74) *Attorney, Agent, or Firm*—Ober/Kaler; Royal W. Craig

(57) ABSTRACT

An improved multi-layer performance lens for protective eyewear such as sunglasses which includes a pass band Rugate filter. The lens design is a sandwich configuration including a polarizing layer between two ophthalmic lens layers in a sandwich configuration, and a Rugate filter applied to one side thereof to yield an exceptional light transmission profile under all light conditions, thereby maximizing protection as well as clarity of vision. In addition, an optional dielectric layer and/or hydrophobic overcoat may be applied. The foregoing layers are arranged to provide a balanced light transmission profile optimum for preventing macular degeneration, cataracts and other ocular injuries.

13 Claims, 2 Drawing Sheets

RUGATE LENS FOR GLASSES

CROSS-REFERENCE TO RELATED APPLICATIONS

The present application is a continuation-in-part of U.S. application Ser. No. 10/000,062 filed 2 Nov. 2001 now abandoned.

BACKGROUND OF THE INVENTION

1. Field of the Invention

The present invention relates to lenses for glasses and, more particularly, to an improved multi-layer polarized lens with Rugate filter specifically designed for protective eye wear (prescription and non-prescription glasses and sunglasses) to reduce harmful light transmission and ocular photochemical damage.

2. Description of the Background

The goal of most protective eye wear (including high-end sunglasses) is to provide a particular light transmission profile that yields the highest protection and perfect vision under all light conditions. To accomplish this goal the lenses for protective eye wear often incorporate numerous layers and coatings all of which combine to give a particular profile. The ocular hazards from ultraviolet solar radiation are well established. Ultraviolet radiation falls within a range of wavelengths below visible light, generally between 100 and 400 nanometers. Long UVA radiation occurs at wavelengths between 315 and 400 nanometers. UVB radiation occurs between 280 and 315 nanometers. UVC radiation occurs between 200 and 280 nanometers. Wavelengths between 100 and 200 nanometers are known as vacuum UV. Vacuum UV and UVC are the most harmful to humans, but the earth's ozone layer tends to block these types of ultraviolet radiation. Nevertheless, the occurrence of ocular injury from ultraviolet exposure has increased dramatically over the past few years, and this is thought to be a result of ozone layer depletion.

According to Prevent Blindness America, the American Academy of Ophthalmology, and the American Optometric Association, the hazards from ultraviolet exposure include eyelid cancer, cataract, pterygium, keratitis, and macular degeneration. Cataracts are a major cause of visual impairment and blindness worldwide. "We've found there is no safe dose of UV-B exposure when it comes to risk of cataract, which means people of all ages, races and both sexes should protect their eyes from sunlight year-round." Infeld, Karen, *Sunlight Poses Universal Cataract Risk*, Johns Hopkins Study, http://www.eurekalert.org/releases/jhu-sunposcat.html (1998). Likewise, age-related macular degeneration (AMD) is the leading cause of blind registration in the western world, and its prevalence is likely to rise as a consequence of increasing longevity. Beatty et al., *The Role of Oxidative Stress in the Pathogenesis of Age-Related Macular Degeneration*, Survey of Ophthalmology, volume 45, no. 2 (September–October 2000). A ten-year Beaver Dam Eye Study was recently completed and is reviewed in the Arch Ophthalmology, vol. 122, p. 754–757 (May 2004). This study proves a direct correlation between the incidence of blue light and AMD but no association between UVA and UVB light and AMD.

In view of the above, a lens designed for protective eye wear that dramatically reduces visible blue light combined with a high degree of UVA and UVB protection will preserve visual function. The Food and Drug Administration has recommended that all sunglasses, prescription or nonprescription, block 99% of UVB and 95% of UVA. Most sunglasses on the market meet these criteria. Indeed, there are sunglasses for outdoor enthusiasts that can achieve 99% of both UVA & B reduction.

The American National Standards Institute (ANSI) rates nonprescription eye wear for their potential to protect the human eye against solar radiation. However, many feel that the ANSI Z80.3 standard falls short. For example, the Z80.3 standard does not require specific quantification of the precise transmittance of ultraviolet radiation, nor blue light or infrared radiation, reflected or scattered solar radiation that is not transmitted through the lens but still reaches the human eye. In addition to simply blocking harmful light, a quality lens for protective eye wear will also reduce glare, add contrast, and yet maintain color balance, all to enhance vision. All this requires a lens with an optimum transmission profile that filters the different colors in proportion to their ability to damage the tissue of the retina, thereby reducing the risks of macular degeneration while actually improving vision. The ANSI standards only address one aspect of the lens.

In an effort to develop a more comprehensive method of rating nonprescription eyewear for its ability to protect the eye against solar damage, the FUBI System has been proposed. The system presents a numeric value, from 0 to 100, for each of the three known harmful portions of the solar spectrum: ultraviolet (UV), blue/violet (B), and infrared (IR). A fourth value was determined for the fashion (F) of the eyewear as it relates to protection of the eye against reflected or scattered radiation that is not transmitted through the eyewear. With FUBI, the numeric value of the system for UV, B, and IR is derived by taking the average transmittance of radiation through each tested lens and weighting it by multiplying that value by a relative toxicity factor (RTF) for each waveband of solar radiation tested. The RTF is derived by multiplying the approximate level of radiation reaching a specified anatomic part of the eye at sea level for each wavelength tested by the inverse of the value of its action spectrum (sensitivity) on that part of the eye. This weighted average transmitted percentage of radiation was then deducted from 100 to derive the FUBI value for the UV, B, and IR range. The numeric value for F was derived by measuring the scattered or reflected light from five known sources of luminance at a fixed distance around opacified lenses on each tested frame. The FUBI system has been successfully used to rate a wide variety of known commercial products of nonprescription eyewear.

It is common to provide polarized lenses in sunglasses to eliminate the horizontal transmission of reflected light through the lenses of the glasses to the eyes of the wearer. The polarizing layer blocks light at certain angles, while allowing light to transmit through select angles. This helps to negate annoying glare reflected off other surfaces such as water, snow, automobile windshields, etc. A polarized filter is produced by stretching a thin sheet of polyvinyl alcohol to align the molecular components in parallel rows. The material is passed through an iodine solution, and the iodine molecules likewise align themselves along the rows of polyvinyl alcohol. The sheet of polyvinyl is then applied to the lens with colored rows of iodine oriented vertically in order to eliminate horizontally reflected light. The sheet of polyvinyl may be applied to a lens in one of two ways: the lamination method or the cast-in mold method. To polarize a glass lens, the lamination method is used whereby the polyvinyl filter is sandwiched between two layers of glass. For plastic lenses, the cast-in mold method is used whereby the polyvinyl filter is placed within the lens mold. Relevant prior art patents might be seen in the Schwartz U.S. Pat. No. 3,838,913 and Archambault U.S. Pat. No. 2,813,459. A significant benefit of polarized lenses is the elimination of glare from reflective surfaces such as water.

Rugate filters are a less well-known lens technology in the context of protective eye wear. A Rugate filter is an interference coating in which the refractive index varies continuously in the direction perpendicular to the film plane. The addition of a rugate filter to a lens can block visible blue and UV light, as well as infrared and laser energy, while allowing other visible light to pass unimpeded. Rugate filters are wavelength specific filters that have existed for about a decade. Their simple periodic continuous structures offer a much wider set of spectral responses than discrete structures, and they typically exhibit a spectrum with high reflectivity bands. This allows the possibility of making high reflectivity mirrors with very narrow bandwidth. As an example, Rugate notch filters from Barr The polarizing layer is sandwiched between two optical lens layers such as ophthalmic CR-39 plastic, polycarbonate, glass, Trivex® or high-index. Associates use refractory metal oxides for edge filters and beam-splitters. Rugate filters are typically formed by a continuous deposition process. It is an easy matter to vary the mixture deposited on the substrate, and thus vary the index of refraction. An overview of Rugate filter technology can be found at Johnson et al., "Introduction to Rugate Filter Technology" SPIE Vol. 2046, p. 88–108 (November 1993), inclusive of how a simple rugate filter is derived from Fourier analysis. Other examples can be found in U.S. Pat. No. 5,258,872 "Optical Filter" by W. E. Johnson, et al. and disclosed in U.S. Pat. No. 5,475,531 "Broadband Rugate Filter" by T. D. Rahminow, et al.

In addition to the foregoing, various mirror coatings have been available to the sunglass industry for decades. These mirror coatings can be applied to the front and/or back surface of a lens to further reduce glare and provide protection against infrared rays. Metallic mirrors comprise a layer of metal deposited directly on a glass lens to create the equivalent of a one-way mirror. U.S. Pat. No. 4,070,097 to Gelber, Robert M (1978). However, most metallic oxide coatings have proven to be very susceptible to scratching and wear, especially near salt water. Salt water tends to degrade such coatings over time. In addition, metallic mirror coatings absorb light and generate heat. The more recent advent of dielectric mirror coatings solve some of the above-referenced problems. For one, dielectric coatings reflect light without absorption, thereby avoiding the discomfort of hot glasses. Moreover, dielectric coatings are more durable than metallic oxide coatings, especially in outdoor coastal environments. For example, a dielectric layer having a medium refractive index, e.g., a mixed $TiO_2$ and $SiO_2$ layer, has been used in a rear view mirror. U.S. Pat. No. 5,267,081 to Pein (1993). Similar titanium and quartz dielectric mirror coatings have been applied to glass lenses. In the context of sunglasses, these dielectric mirror coatings of titanium and quartz prevent salt water damage while providing additional reflection of light.

U.S. Pat. Nos. 6,077,569 and 5,846,649 to Knapp et al. suggest a plastic sunglass lens coated with an abrasion resistant material and a dielectric material (including silicon dioxide or titanium oxide). The abrasion-resistant coating layer includes a transparent adhesion layer comprised of C, Si, H, O, and/or N which is deposited by ion-assisted plasma deposition. A second dielectric coating layer is deposited, and a thin metallic mirror layer may be interposed between the abrasion-resistant layer and the dielectric materials to enhance reflectivity and color characteristics. However, the prior art does not teach or suggest how to incorporate a polarizing filter, multi-layer dielectric mirror, and a hydrophobic overcoat in a blue-blocking amber or gray tint lens to provide an outstanding spectroscopic profile, especially for a marine environment.

Hydrophobic coatings are also known in a more general context for protecting lens surfaces (U.S. Pat. No. 5,417,744 to Ameron) and for contact lenses (U.S. Pat. No. 4,569,858 to Barnes Hind). Hydrophobic coatings are also appropriate near water to protect underlying layers of a lens over time. Hydrophobic coatings are especially good for protecting mirrored lenses as above. For example, U.S. Pat. No. 5,928,718 to Dillon discloses a protective coating for reflective sunglasses incorporating a conventional resin/polymer type coating for protection of the mirror finish against abrasion and smudging.

The present inventor has found that a Rugate filter when used in combination with a polarizing layer, with optional dielectric layer and hydrophobic coating, in a lens sandwich configuration yields an exceptional light transmission profile under all light conditions that maximizes the degree of protection as well as clarity of vision, as borne out by the FUBI rating system. The Rugate filter, polarizing layer, and optional dielectric layer and hydrophobic coating are incorporated in a lens sandwich with optical lens layers comprising any one of conventional glass, plastic (CR-39), polycarbonate, Trivex® or high-index plastic or glass layers.

The particular lens layers are a matter of design choice. Glass has a number of advantages in that it is the most scratch-resistant and optically pure material used in ophthalmic lenses. However, glass is about twice the weight of regular (CR-39) plastic and has safety issues. Conventional plastic lenses (CR-39) weigh less than glass lenses and can be tinted to almost any color and density. They are more easily scratched than glass but can have scratch protection applied. Polycarbonate lenses are the most impact resistant lenses available and is commonly used in protective eyewear for sports. Polycarbonate has a high refractive index and is therefore lighter and thinner than conventional plastic lenses. Polycarbonate absorbs all harmful UV light, includes scratch protection and can be made extra thin in the centers and at the edges because of their unique strength. However, polycarbonate is not as optically pure as regular plastic or glass. Trivex® is a relatively new monomer lens material which combines superior optics, impact resistance, and light weight. Trivex® is gaining recognition as delivering the most comprehensive performance of the enumerated lens materials, and yet remains relatively expensive. In addition, high-index plastic layers can be used, albeit they have a high index of refraction and are not as optically correct. Nevertheless, high-index plastic lenses can be made with less material and are thinner and usually lighter weight than regular CR-39 plastic. High-index lenses also absorb all harmful UV light and can be tinted to any shade or color. High-index glass is also available to reduce lens thickness but is considerably heavier.

SUMMARY OF THE INVENTION

It is an object of the present invention to provide a combination of polarization, and Rugate filter technology in a lens sandwich in such a way as to maximize the degree of protection as well as clarity of vision under all light conditions.

It is another object to provide a combination of: a) an outer hydrophobic overcoat to protect the lens from seawater and smudging; b) two layers of optical lens material; c) a polarizing layer between the two layers of lens material; c) a Rugate bandpass filter to further reduce the visible blue light as well as infrared and laser energy; and optionally, d) a dielectric layer and e) hydrophopic coating for protection.

According to the present invention, the above-described and other objects are accomplished by providing an improved lens for protective eye wear that combines a Rugate filter with a polarizing layer in an optical lens sandwich and, optionally, a dielectric layer and/or hydrophobic overcoat, to yield an exceptional light transmission profile under all light conditions, thereby maximizing protection as well as clarity of vision.

The Rugate filter is a multi-layer Rugate filter providing rejection bands below 400 nm and above 680 nm (which reflects substantially 100% of UV-A & B light below 400 nm is reflected, and substantially 100% of near infrared light above 680 nm). The Rugate filter is applied to the exterior of a lens sandwich, as an outer or inner layer.

The lens sandwich comprises at least two optical lens layers comprising any one of conventional glass, plastic (CR-39), polycarbonate, Trivex® or high-index plastic or glass layers, as a matter of design choice.

The polarizing layer is sandwiched between the two optical lens layers. An optional dielectric layer is applied exteriorly of the lens sandwich, and am hydrophobic coating may be applied over the dielectric layer to protect the lens and reduce smudging. The foregoing layers are arranged to provide a balanced light transmission profile optimum for preventing macular degeneration, cataracts and other ocular injuries.

Superior test results for the above-described lenses (for performance, function and durability), inclusive of the stringent FUBI rating system, distinguish them from existing lenses and evidence the synergistic relationship of the particular combination of layers.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Disclosed is an improved lens designed for protective eye wear that combines a Rugate filter with a polarizing layer in a plastic, polycarbonate, Trivex® or glass sandwich to yield an exceptional light transmission profile under all light conditions, thereby maximizing protection as well as clarity of vision.

Figure 1:
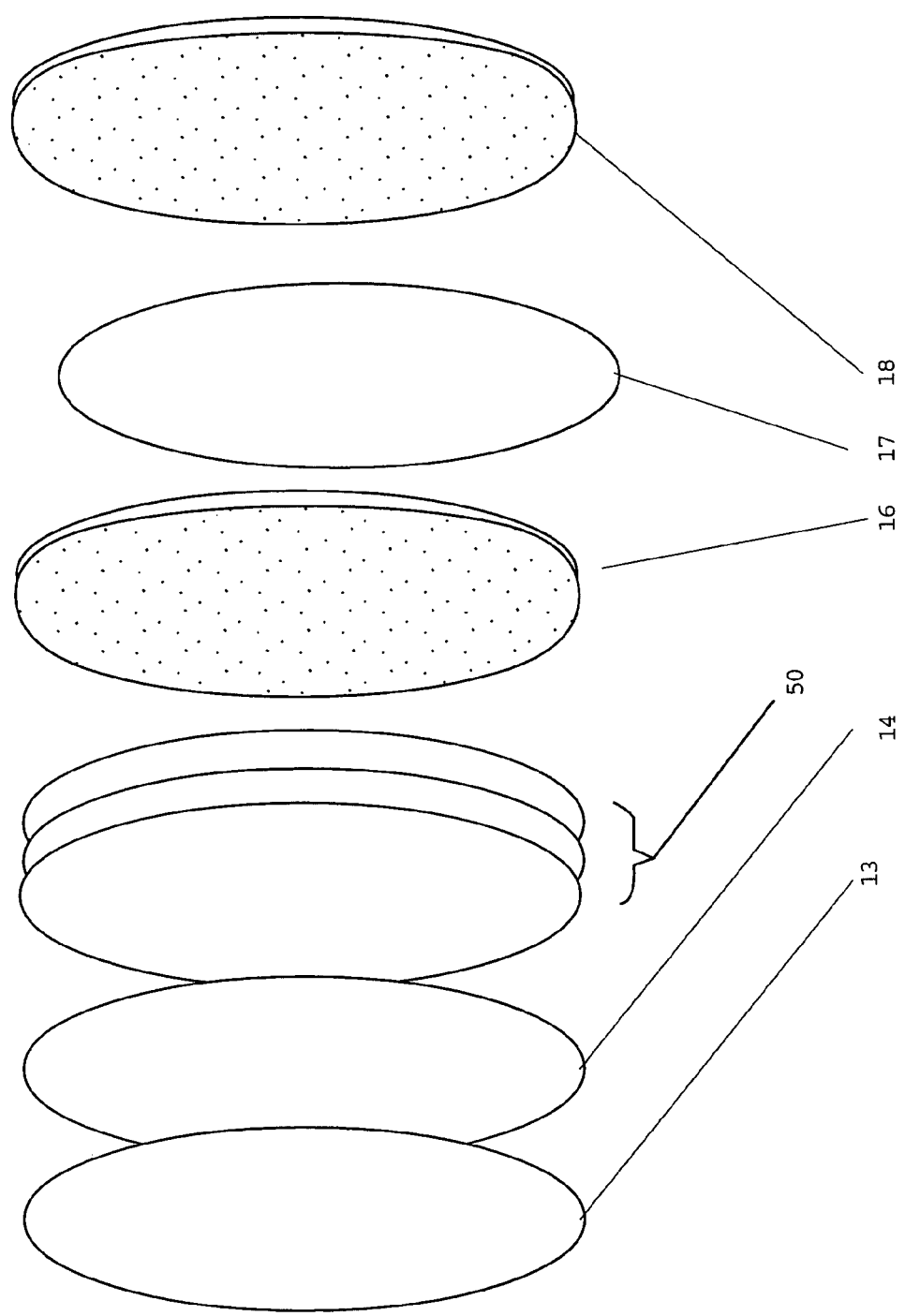
FIG. 1 is a perspective exploded sketch showing the various lens layers according to the present invention.

FIG. 1 is a perspective exploded sketch showing the various lens layers according to a preferred embodiment of the present invention.

The lens layers are arranged in a sandwich configuration including a polarizing filter layer 17 bonded between two optical lens layers 16, 18, the latter being any two conforming glass, plastic (CR-39), polycarbonate, Trivex® or high-index plastic or glass layers, as a matter of design choice. It is, however, noteworthy that CR-39 (plastic) or polycarbonate lens blanks are capable of molecular bonding, which may be molecularly-bonded about the polarizing filter layer 17 to provide better wear characteristics as follows. In addition, both the first lens layer 16 and second lens layer 17 may be colorized to increase contrast, such as with high-contrast blue-blocking amber-tint, color discriminating grey tint, or otherwise.

For the polarizing filter layer 17, a conventional polarizing film filter is interposed between the two optical lens layers 16, 18 as either a laminated or a cast suspended filter. Laminated lenses are made by sandwiching the polarized film 17 between the two layers of plastic or polycarbonate or glass 16, 18, utilizing an adhesive to hold them together. However, adhesive can make the laminated lens appear hazy and the adhesion can fail when subjected to high heat and processing forces. CR-39 (plastic) or polycarbonate lens blanks may be cast with a suspended polarizing filter 17 and need not rely upon adhesives to hold everything together. In this case, molecular bonding is used to chemically join the lens layers 16–18, thus totally encapsulating the polarizing filter layer 17 between the two CR-39 plastic lens layers 16, 18, thereby avoiding haze and delamination.

Next, a Rugate filter 50 comprising alternating layers are applied (adhered or molecularly bonded) to the exterior of the existing lens sandwich 16–18, either as an outer layer 9 (as shown) or inner layer, to eliminate all ultraviolet light as well as all infrared and laser energy. The Rugate filter 50 is a multiple dielectric layer filter composed of alternate layers of silicon nitride ($Si_3N_4$) and silicon dioxide ($SiO_2$) or alternate layers of hafnium oxide ($HfO_2$) and $SiO_2$. This layered structure varies the index of refraction to produce a profile with the desired optical properties. The Rugate filter 50 according to the present invention is made as an effective bandpass filter to exhibit a controlled light transmission profile. In accordance with the present invention, the alternate Rugate filter 50 layers are stacked together to form a pass band, the pass band being defined at bandpass cutoffs of 400 nanometers (nm) and 780 nm, respectively. The Rugate filter 50 layers are each a gradient index structure having a sinusoidal refractive index profile. The properties of the Rugate filter 50 layers are determined by the values of the average refractive index (Na) and the peak-to-peak modulation of the refractive index (Np). The refractive index as a function of thickness, N(t), is given by:

$$N(t) = Na + \tfrac{1}{2} Np \, \mathrm{Sin}(2\, \pi t/P)$$

where P is the modulation period of the refractive index profile. A rugate filter will strongly reflect light at a wavelength of $\lambda 0 = 2\, NaP$. Thus, given notch cutoffs of 400 nm and 780 nm, the average refractive index (Na) and the peak-to-peak modulation of the refractive index (Np) for each of the respective Rugate filter 50 layers can easily be determined.

Figure 2:
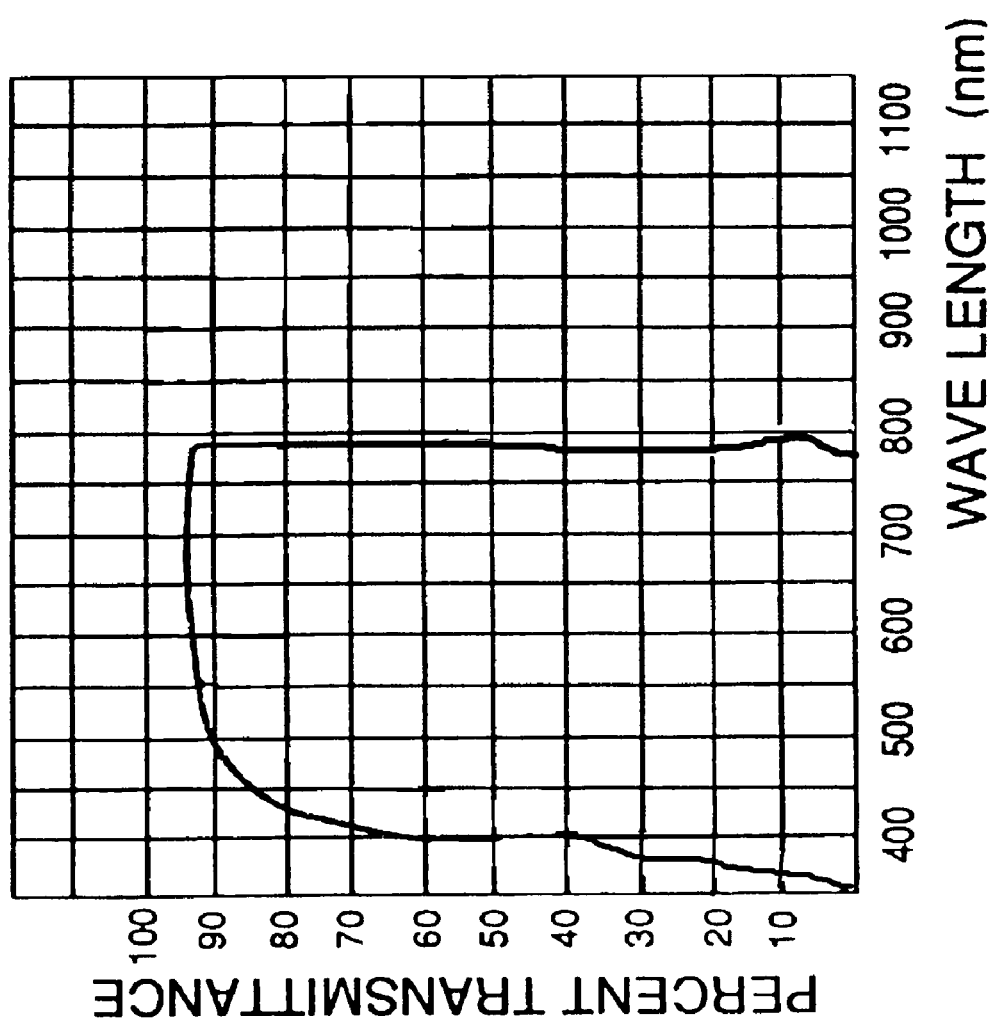
FIG. 2 is a graph of the spectral transmittance of the Rugate filter 50 measured from 290 nm to 1,400 nm.

The Rugate filter 50 according to the present invention results in bandstop characteristics as shown in FIG. 2, which is a graph of the spectral transmittance of the Rugate filter 50 measured from 290 nm to 1,400 nm. The entire UV spectrum is eliminated, including the UVB (290 nm to 320 nm) and UVA (321 nm to 399 nm) range. Visible light is passed, inclusive of the B spectrum range extending from 400 nm to 515 nm. The IR spectrum includes the near infrared range (from 700 nm to 1,400 nm). A portion of the IR spectrum beyond 780 nm is eliminated. Thus, the Rugate filter 50 effectively forms a pass band between 400 nanometers (nm) and 780 nm, achieving 99% of both UVA & B obstruction and dramatically reducing visible blue light. Consequently, the Rugate filter 50 as incorporated into the sunglass lens of the present invention will preserve visual function.

To form Rugate filter 50 layers, a typical Rugate deposition process may be used in which a low index material and high index material are deposited, the rate of deposit of the low index material being held constant while the rate for the high index material is varied to achieve the correct refractive index modulation in the deposited film. A combination of Silicon, Oxygen and Nitrogen compounds may be used in specific ratios to provide a pre-defined variation in the index of refraction. For example, Silicon Dioxide ($SiO_2$) provides an index of refraction of about 1.5 while Silicon Nitride ($Si_3N_4$) provides a value of about 2.0. It should be noted that other combinations can be used to achieve this desired light transmission profile. For example, tantala/silica and hafnia/silica combinations have been used for multilayer coatings in the UV-A and UV-B spectral range, and layers of silica and alumina have been used in the UV-B and UV-C region. These materials are deposited by means of a plasma-enhanced chemical vapor deposition process (PECVD). See, for example, Goetzelmann et al., "Uv Coatings Produced with Plasma-ion-assisted Deposition", SPIE Vol. 3738, p. 48–57 (September 1999), which describes the plasma-ion-assisted deposition for the production of multilayer coatings for the visible and NIR spectral range including rugate filters.

In the present case, Rugate filter 50 coatings can be deposited on the lens layer 16 using an increment deposition approach in which the variation in the index of refraction is calculated to provide a Rugate filter 50 which achieves the desired 780 nm notch filter profile. The optical thickness (Ot) of the layer being deposited may be obtained by measuring the reflectance (R) of the thin film at wavelengths away from the reflection band of the filter. A computer and a monochrometer are used in a known manner to control the deposition and monitoring. Prior to beginning the deposition of thin film layers of filter 50, the predetermined refractive index profile at 780 nm is stored in the memory of the computer. As the deposition process proceeds, the computer receives signals from the monochrometer that correspond to the thin film reflectance spectrum. Using the reflectance spectrum detected by the monochrometer, the computer calculates a current optical thickness estimate. Next, the refractive index specified by the predetermined profile for that optical thickness of the film is calculated. The computer then provides a control signal to drive an energy source so that the mixture of evaporated materials produces the specified refractive index for the current optical thickness. This process is repeated continuously until the deposited layer corresponds to the specified refractive index profile. Deposition is terminated when the total predetermined optical thickness is achieved. This results in a single layer Rugate 50 film having a continuously varying index of refraction along a thickness direction with a number of maxima and minima in the index.

Preferably, the Rugate filter 50 used herein are color-neutral so as not to alter the light transmission profile of the other lens layers. See, for example, Johnson et al., "Color Neutral Rugate Filters", SPIE Vol. 2046, p. 132–140 (November 1993), which describes a transmissive rugate filter which is designed to reflect a portion of the visible spectrum and yet not appear to have a dominant color.

The combination of the above-described hydrophobic layer 13, Rugate filter 50, and optical lens layers 16, 18 sandwiching a polarizing lens layer 17 dramatically reduce glare and increase contrast in varying types of light conditions, and the sandwiched configuration is most durable for use in a marine environment. The light transmission properties of the improved multi-layer sunglass lens are optimized for maximum ocular safety. Ultraviolet absorption of 100% of UV-A & B light occurs to at least 400 nm, average blue light transmission is 6.84%, and the near infrared range inclusive of laser light (from 700 nm to 1,400 nm) is eliminated.

In addition to the basic sandwich configuration described above, an optional multi-layered dielectric mirror layer 14 may be applied exteriorly (over the Rugate filter layer 50 or, if Rugate layer 50 is placed interiorly, over outer optical lens layer 16). U.S. Pat. No. 5,844,225 to Kimock et al discloses an optical coating design formed in a multi-layer "dielectric stack" configuration for producing an anti-reflection feature, plus a method for fabricating a coated substrate product. Kimock et al. '225 also suggests various stacked layers inclusive of titanium oxide, nitride, zirconium nitride, boron nitride, yttrium oxide, silicon oxide, silicon dioxide, zirconium oxide, silicon carbide, aluminum oxide, aluminum nitride, and various mixtures thereof. The optional multi-layered dielectric mirror layer 14 may be applied using a similar method to create a stacked layer which actually comprises six equal-thickness thin film layers (2–3 nm total) of titanium oxide, silicon dioxide (quartz), zirconium oxide, and chromium, each thin film layer being vacuum deposited separately in alternating 90 degree angles to provide a reflective mirror finish. Dielectric mirrors in general combine high reflection values with outstanding durability characteristics. These coatings can generally exhibit significantly higher reflectance values than metallic films over specific wavelength intervals. The present stacked dielectric mirror layer 14 with particular constituents applied in alternating angular deposits further optimizes the lens to reduce light transmission through the entire UV and visible light spectrum, and may be used as desired to supplement the performance of the Rugate filter 50.

Finally, a hydrophobic overcoat 13 may be applied as an outermost layer 13 of the lens sandwich. The hydrophobic overcoat 13 is applied directly onto the dielectric layer 14 or Rugate filter layer 50 depending on the chosen sandwich configuration. The hydrophobic coating is preferably a silicon-based chemical coating of known type such as commercially available from OMS, 177108 Canada Inc., 5120 Courtrai, Suite 12, Montréal, Québec, Canada H3W 1A7. This coating 13 may be deposited by known dipping or chemical vapor deposition processes, and it makes the lens water repellant for better vision during rainstorms or water related activities. In addition, hydrophobic overcoat 13 makes the lens easier to clean as contaminants do not adhere to the lubricated lens surface easily. Moreover, the hydrophobic overcoat 13 resists smudging and streaking due to environmental and body contaminants. This hydrophobic layer 13 also produces a sealing effect to protect the lens and other base coatings, and to increases the longevity of the underlying layers. The hydrophobic coating 13 bonds with the lens to create a barrier against dirt, repelling dust, grease and liquid. The coating is non-acidic. It allows the lens to be cleaned with a wiping cloth without cleaning solution. The hydrophobic coating does not optically change the lens properties. It is extremely durable water repellant and not only repels water, but any other undesirable matter, including salt spray. The hydrophobic coating also combats bacterial build-up as dirt and oils do not stay on the lens.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A lens for protective eyewear to preserve ocular health, comprising:
    a first ophthalmic lens layer;
    a second ophthalmic lens layer;
    a polarizing layer sandwiched between said first and second ophthalmic lens layers; and
    a Rugate filter layer defining a pass band filter with cutoffs at approximately 400 nanometers (nm) and 780 nm, said rugate filter being applied exteriorly to one of said first and second ophthalmic lens layers;
    whereby said layers combine to provide a balanced light transmission profile in which substantially 100% of UV-A & B light below 400 nm is reflected, and substantially 100% of near infrared light above 680 nm is reflected.

2. The lens for protective eyewear to preserve ocular health according to claim 1, wherein said Rugate filter layer further comprises a multi-layered Rugate filter.

3. The lens for protective eyewear to preserve ocular health according to claim 2, wherein said multi-layered Rugate filter comprises a first Rugate layer for reflecting light below 400 nm, and a second Rugate layer for reflecting light above 680 nm.

4. The lens for protective eyewear to preserve ocular health according to claim 1, wherein said polarizing layer is encapsulated between two optical lens layers.

5. The lens for protective eyewear according to claim 1, wherein said first ophthalmic lens layer and second ophthalmic lens layer are any one from among the group consisting of glass, plastic (CR-39), polycarbonate, Trivex® and high-index plastic or glass.

6. The lens for protective eyewear according to claim 1, further comprising a dielectric minor in advance of said rugate filter layer for supplementing the rugate filter in reducing glare and overall light transmission.

7. The lens for protective eyewear according to claim 1, further comprising a hydrophobic overcoat over said rugate filter and lens sandwich.

8. The lens for protective eyewear according to claim 6, further comprising a hydrophobic overcoat over said dielectric mirror.

9. The lens for protective eyewear according to claim 1, wherein said first lens layer and second lens layer are colorized with one from among the group of high-contrast blue-blocking amber-tint and color discriminating grey tint.

10. The lens for protective eyewear according to claim 8, wherein said dielectric minor further comprises a multi-layered dielectric mirror.

11. A sunglass lens comprising rugate filter means for selectively filtering wavelengths of light to preserve macular integrity.

12. A sunglass lens, comprising:
    a polarizing film layer sandwiched between first and second ophthalmic lens layers;
    a rugate filter applied to one of said first and second ophthalmic lens layers, said rugate filter being formed as a transparent coating with an incrementally varying refractive index profile along its width;
    a dielectric mirror for supplementing the rugate filter in reducing glare and overall light transmission;
    whereby said polarizing layer, rugate filter, and first and second ophthalmic lens layers are arranged to provide a balanced light transmission profile in which substantially 100% of UV-A & B light is absorbed to at least 400 nm.

13. The sunglass lens according to claim 12, further comprising a hydrophobic overcoat on said dielectric mirror layer.

* * * * *